United States Patent

Simonetta

[15] 3,677,102
[45] July 18, 1972

[54] FREE-WHEEL DEVICE FOR TRANSMITTING TORQUES AND REVERSIBLE RATCHET DOG COMPRISING SAME

[72] Inventor: Enrico Simonetta, Casale Litta, Italy
[73] Assignee: USAG S.p.A. Gemonio, Verese, Italy
[22] Filed: June 2, 1970
[21] Appl. No.: 42,788

[52] U.S. Cl..................................................74/143, 81/63
[51] Int. Cl.......................................................F16h 27/02
[58] Field of Search..........................74/143, 156, 157; 81/63

[56] References Cited

UNITED STATES PATENTS

| | | | |
|---|---|---|---|
| 3,044,591 | 7/1962 | Kilness | 74/157 |
| 3,096,659 | 7/1963 | Jenkins | 74/157 |
| 3,233,481 | 2/1966 | Bacon | 74/157 |

Primary Examiner—William F. O'Dea
Assistant Examiner—Wesley S. Ratliff, Jr.
Attorney—Wenderoth, Lind & Ponack

[57] ABSTRACT

A free-wheel device and reversible ratchet dog comprising same, wherein an engagement between two torque transmitting elements is obtained in either directions of rotation by means of a pawl housed in a first torque transmitting element in such a manner that, when the device is acted upon, said pawl is submitted to dragging and reacting forces which resultant stresses the pawl into engaging relationship with the second torque transmitting element.

4 Claims, 4 Drawing Figures

PATENTED JUL 18 1972　　3,677,102
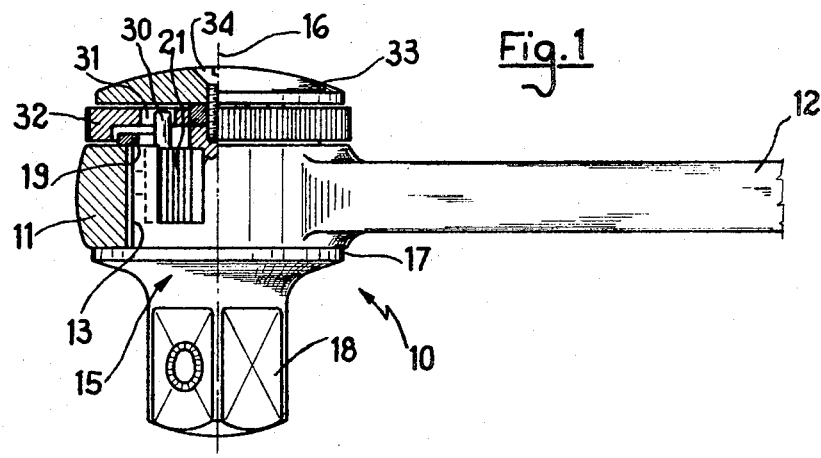
Fig.1
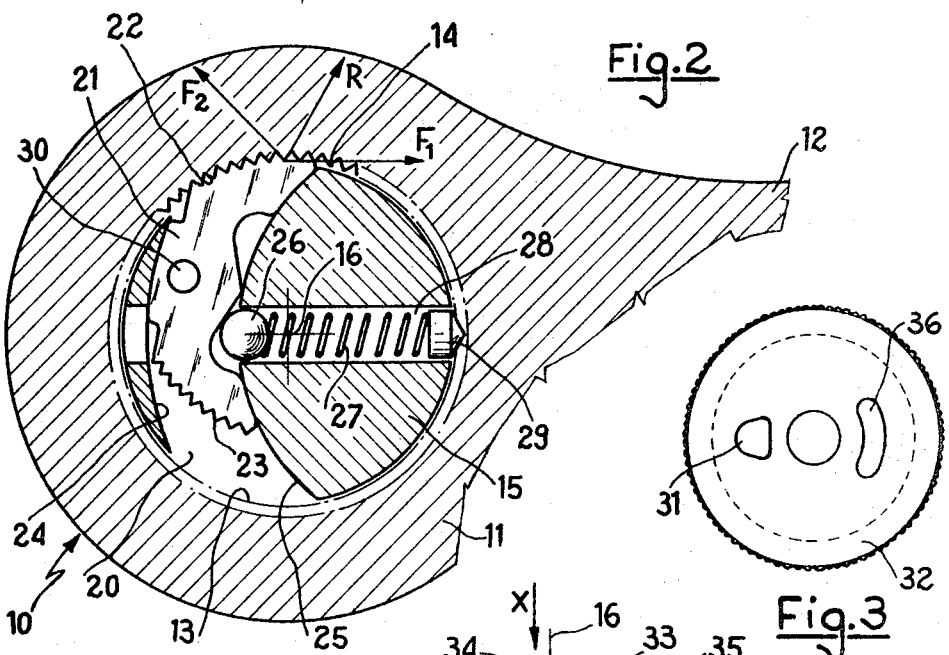
Fig.2
Fig.3
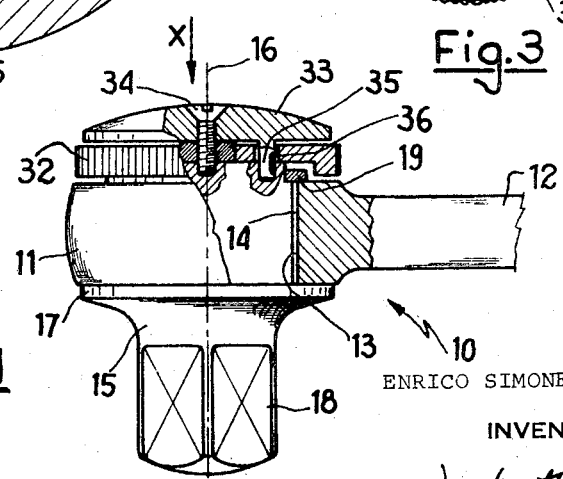
Fig.4
ENRICO SIMONETTA
INVENTOR
BY Wenderoth, Lind
and Ponack Attorneys

FREE-WHEEL DEVICE FOR TRANSMITTING TORQUES AND REVERSIBLE RATCHET DOG COMPRISING SAME

BACKGROUND

This invention concerns a free-wheel device adapted to transmit torques in either directions between a driving element and a resisting element, as well as a reversible ratchet dog comprising said novel and improved free-wheel device.

More detailedly, this invention concerns a free-wheel device, preferably associated with a reversible ratchet dog or the like, wherein the transmission of torque in a selected direction occurs in a reliable and accurate manner under any load condition and in particular without any danger that its mutually engaging components may partly or wholly disengage from each other during said torque transmission, and consequently without any damaging danger.

Already known are free-wheel devices particularly designed to be embodied in reversible ratchet dogs for tightening socket wrenchs or the like, which usually comprise a driving element and a resisting element fitted in coaxial freely rotatable relationship, said elements being adapted to engage with each other in a selected direction of rotation by means of at least one pawl or similar means, that is freely inserted into a slot of one element and can engage with the other element by suitable releasable coupling means.

The driving element is usually formed with an innerly toothed cylindric bore wherein said resisting element is housed, said resisting element comprising in turn said pawl seating slot. The pawl is formed with two spaced toothed portions, adapted to alternately engage with said inner toothing of driving element, in order to transmit a torque in either directions of rotation according to the position taken by said pawl in said slot. Said pawl seating slot usually comprises a pawl abutment and reaction wall located on one side of the driving element cylindric bore and also cylindrically shaped which extends convexly in respect of said bore axis, said pawl comprising a correspondingly shaped mating surface. Thus the pawl, according to its position in said slot, is acted upon by forces ensuing from said toothed portion and said abutment wall respectively, and forming a resultant couple adapted to engage said pawl with said driving element toothed bore.

Although such devices have found a very wide acceptance and application, however they still show many drawbacks, because when very high stresses are exerted, the forces engaging said pawl with the driving element toothing may not be sufficient to keep said pawl and driving element toothings into a thorough mutual engagement, and the torque transmitting forces would be exerted on insufficient contact areas, thus causing a wrenching-off at least a complete disengagement of toothings and thus an operating failure of the ratchet dog. Further drawbacks of said already known devices come from means adapted to control the reversal of ratchet dog operative direction ad acting on said pawl; said means are usually fitted above said torque transmitting elements and prevent the assembly from being submitted to stresses directed perpendicularly to the plane of transmitted torques (e.g. by hand) without danger to cause a reversal of driving direction.

SUMMARY

An object of this invention is to provide a reversible free-wheel device and a ratchet dog comprising same, by which the drawbacks of already known devices and ratchet dogs are wholly avoided.

Another object of this invention is to provide a reversible free-wheel device by which a reliable torque transmission is ensured without any danger of partial or complete disengagement of pawl coupling means with respect to a related transmission element.

A further object of this invention is to provide a free-wheel device of the above defined type, wherein the operating components are designed to allow a reliable and safe torque transmission without any drawback.

Another object of this invention is to provide a device of the above defined type, adapted to be associated with a reversible ratchet dog or the like, comprising means for a quick rotation of its resisting element when reduced resisting forces are to be overcome.

A further object of this invention is to provide a free-wheel device and a related ratchet dog, wherein control means for controlling the reversal of pawl driving direction are fitted above the torque transmitting elements and coaxially therewith, said device and ratchet dog comprising means to support a manually or mechanically exerted stress directed perpendicularly to the plane of transmitted torques.

Accordingly, the free-wheel transmitting device of this invention and comprising two transmitting elements and a coupling pawl mutually arranged as previously stated, is essentially characterized in that the walls of its pawl seating slot are shaped in such a manner as to exert a reaction force on the pawl that, when combined with the force transmitted to said pawl through the device mutually engaging means, leads to a resultant force acting on said pawl in a direction to steadily and uniformly increase a coupling effect under load of mating surfaces of said mutually engaging means. In particular, when said mutually engaging means consists of mating toothed surfaces, said resultant force is substantially perpendicular to pitch circles of said mutually engaging toothings and is directed to increase such engagement.

According to a particularly advantageous embodiment of this invention, the above stated features of said resultant force acting on the pawl can be easily obtained by providing a pawl seating slot defined by cylindrical surfaces having an axis shifted in respect of the transmitting element axis and concave shaped in respect of said transmitting element axis.

As previously stated, this invention also relates to a reversible ratchet dog comprising a free-wheel device of the above stated type, wherein said pawl is operated by a bush fitted coaxially to both transmitting elements and free to rotate in respect thereof, said bush being drivably connected with said pawl as well as with said free-wheel resisting element in order to impart a quick rotation thereto, said latter connection being established by means that allow a limited rotation of said bush in both directions for the abovestated pawl control. Above said bush and independently therefrom a small cover or the like is provided, whereon a force can be exerted in a direction perpendicular to plane of transmitted torques.

DRAWINGS

FIG. 1 is a partly sectioned side view of a reversible ratchet dog according to this invention.

FIG. 2 is a section of a free-wheel device of the ratchet dog shown in FIG. 1, along a plane perpendicular to that of said FIG. 1.

FIG. 3 is a plan view of a bush adapted to control said ratchet dog.

FIG. 4 is a view similar to that of FIG. 1 with a different sectioned zone of said ratchet dog.

PREFERRED EMBODIMENT

Referring now to the drawings, the ratchet dog shown therein comprises, in an already known manner, a driving transmitting component 11, having a substantially cylindric shape and wherefrom an operating lever 12 extends. Said element 11 is formed with an inner cylindrically shaped bore 13, wherein an inner toothing 14 is cut. Said bore 13 houses a coaxially located resisting element 15 which is free to rotate in respect of said element 11 about their common axis 16, said element 15 being axially retained to said element 11 through a shoulder 17 wherefrom a square hub 18 extends for engagement with a socket wrench or the like to be tightened and on the other side e.g. by a snap ring 19. Said resisting element 15 has a cylindric slot 20 adapted for freely housing a pawl 21 having a shape similar to that of said slot and comprising two toothed ends 22 and 23 respectively.

Said toothed ends can engage alternately, according to the position taken by said pawl 21 in said slot 20, with mating portions of said toothing 14, whereby the torques imparted to said element 11 are transmitted to said element 15 in one direction of rotation, while in the opposite direction of rotation said two toothings 22 or 23 and 14 can slide without meshing with each other.

According to a first feature of this invention, both surfaces 24 and 25 (see FIG. 2), which define said slot 20, are cylindrically shaped and the axis thereof is shifted with respect to said axis 16 of said two transmitting elements 11 and 15, the concavity of said surfaces being turned towards said axis 16. Thus, when a correspondingly shaped pawl 21 is stressed, e.g. by a force $F_1$ exerted through said driving element 11, a reaction force $F_2$ will arise on said pawl 21 in a direction perpendicular to said surfaces 24 and 25, in such a manner that their resultant R is substantially perpendicular to pitch circles of said engaging toothings 14 and 22. Said resultant R forces the pawl 21 against said toothing 14 in order to attain a deep and complete mutual toothing engagement. Obviously, when the element 11 is rotated in the opposite direction, i.e. in a counterclockwise direction, said forces acting on said pawl 21 will tend to disengage said toothings from each other, thus allowing a free and easy relative rotation of the elements 11 and 15.

As it can be seen from the drawings, said pawl 21 is held in its selected operating position by a spring biased ball 26, the related spring 27 being housed in a correspondingly shaped bore 28 of said element 15 and carrying at its opposite end a pin 29 formed with a cone shaped end adapted to engage with said toothing 14. Said pin 29 connects the driving element 11 with the resisting element 15 by means of a force exerted by the spring 27 in order to prevent the element 15 from being moved along with the pawl 21 during the ratchet dog controlling motions thereof. Said ratchet dog controlling motions of pawl 21 between its operative positions are imparted thereto by a pin 30 extending from said pawl and engaging into an orifice 31 formed in a knurled bush 32. Said bush 32 is fitted coaxially and can be freely rotated with respect to said elements 11 and 15 in such a manner that a limited rotation thereof in either directions results in a corresponding shifting of said pawl 21 toward one of its stable operating positions.

Above said bush 32 a cover 33 is firmly secured to said element 15 e.g. by means of a screw 34 in order to be rotated therewith. Onto said protective cover 33 a pressure can be exerted e.g. manually in a direction perpendicular to the plane of the transmitted torques (in direction of arrow X in FIG. 4) for ensuring a more reliable engagement with the driven socket wrench, without any danger to inadvertently operate the bush 32 and thus to reverse the direction of operating rotation.

Moreover, a pin 35 (see FIG. 4) extends from said cover 33 and into an elongated hole 36 of said bush 32, in order to indirectly connect said bush 32 with the element 15. In such a manner a quick rotation of said element 15 can be obtained when a small resistance only is to be overcome, by manually operating said bush 32. Said elongated hole 36 allows the pawl 21 to be easily and reliably shifted by said bush 32 without acting on said element 15.

While the invention has been described with reference to a preferred embodiment thereof, it is to be understood that many changes and modifications may be made thereto without departing from the spirit and scope of the invention.

I claim:

1. A wrench for alternately transmitting torques in either direction comprising a driving element, a resisting element having a slot coaxially rotationally freely mounted in said driving element, a pawl freely mounted in said slot, mutually engaging means upon said pawl and said driving element having mating surfaces, retaining and reacting wall means associated with said slot to exert a reaction force on said pawl so that when combined with a force transmitted to said pawl through said mutually engaging means causes a resultant force on said pawl acting to steadily and uniformly increase the coupling effect under stress of the mating surfaces of said mutually engaging means, said driving element having a cylindric bore with an inner toothed cylindrical wall, said resisting element being housed in said bore, said slot having cylindrical surfaces having an eccentric axis to the axis of said elements and extending concavely thereto, said pawl having two spaced toothed portions, means to shift said pawl in said slot to bring either of said two spaced toothed portions in mesh with said inner toothed cylindrical wall to reverse the torque transmission direction, said means to shift said pawl comprising bush means coaxially fitted and freely rotatable on said elements having means to engage said pawl.

2. A wrench according to claim 1 wherein said mating surfaces comprise toothed portions formed on said pawl and on one of said elements so that said resultant force is substantially perpendicular to the pitch circles of said engaged mating toothed portions.

3. A ratchet wrench according to claim 1, wherein said bush means is connected with said resisting element by a pin.

4. A ratchet wrench according to claim 1, wherein a cover is fitted above said bush means for supporting a stress applied in a direction perpendicular to the plane of the transmitted torque.

* * * * *